(12) United States Patent
Basak et al.

(10) Patent No.: US 9,864,749 B2
(45) Date of Patent: Jan. 9, 2018

(54) METHODS FOR PROVISIONING WORKLOADS IN A STORAGE SYSTEM USING MACHINE LEARNING AND DEVICES THEREOF

(71) Applicant: NetApp, Inc., Sunnyvale, CA (US)

(72) Inventors: Jayanta Basak, Bangalore (IN); Kushal Wadhwani, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 220 days.

(21) Appl. No.: 14/317,963

(22) Filed: Jun. 27, 2014

(65) Prior Publication Data

US 2015/0379420 A1    Dec. 31, 2015

(51) Int. Cl.
*G06F 17/30*    (2006.01)

(52) U.S. Cl.
CPC .................. *G06F 17/3007* (2013.01)

(58) Field of Classification Search
CPC .................. G06N 99/005; G06F 17/3007
USPC .................................................. 707/718
See application file for complete search history.

(56) References Cited

U.S. PATENT DOCUMENTS

| | | | |
|---|---|---|---|
| 8,250,581 B1 | 8/2012 | Blanding | |
| 8,312,460 B1 | 11/2012 | Blanding | |
| 8,954,381 B1* | 2/2015 | Naamad | G06F 3/0685 707/609 |
| 9,052,830 B1* | 6/2015 | Marshak | G06F 3/064 |
| 2002/0091722 A1* | 7/2002 | Gupta | H04L 12/2602 |
| 2004/0193397 A1* | 9/2004 | Lumb | G06F 13/105 703/24 |
| 2004/0225631 A1* | 11/2004 | Elnaffar | G06F 9/5083 |
| 2008/0022284 A1 | 1/2008 | Cherkasova et al. | |
| 2008/0262823 A1 | 10/2008 | Oslake et al. | |

(Continued)

OTHER PUBLICATIONS

Gulati et al., "Pesto: Online Storage Performance Management in Virtualized Datacenters," Proceedings of the Second ACM Symposium on Cloud Computing (SOCC'11), Cascais, Portugal, (Oct. 2011), 14 pages.

(Continued)

*Primary Examiner* — Albert Phillips
*Assistant Examiner* — Hicham Skhoun
(74) *Attorney, Agent, or Firm* — Klein, O'Neill & Singh, LLP

(57) ABSTRACT

A method, non-transitory computer readable medium, and provisioning advisor device that obtains an intensity and characteristics for each of a plurality of training workloads from storage device volumes. For each of the training workloads, at least first and second training workload parameters are generated, based on the training workload intensity, and an associated training workload signature is generated, based on the training workload characteristics. The first and second training workload parameters and associated training workload signatures are stored in a mapping table. A signature and an intensity for a query workload are obtained. First and second query workload parameters are determined based on a correlation of the query workload signature with the training workload signatures of the mapping table. An estimated latency for the query workload is determined, based on the first and second query workload parameters and the query workload intensity, and the estimated query workload latency is output.

21 Claims, 4 Drawing Sheets

(56) References Cited

U.S. PATENT DOCUMENTS

| | | | |
|---|---|---|---|
| 2009/0070623 | A1 | 3/2009 | Sciacca |
| 2009/0083737 | A1 | 3/2009 | Ben-Yehuda et al. |
| 2009/0183016 | A1 | 7/2009 | Chan et al. |
| 2009/0235268 | A1 | 9/2009 | Seidman et al. |
| 2009/0271662 | A1 | 10/2009 | Tarta |
| 2011/0145554 | A1 | 6/2011 | Struik |
| 2014/0244643 | A1* | 8/2014 | Basak ............... G06F 17/3071 707/737 |
| 2015/0242133 | A1* | 8/2015 | Smith ............... G06F 3/0613 711/114 |

OTHER PUBLICATIONS

Gulati et al., "BASIL: Automated IO Load Balancing Across Storage Devices," Proceedings of the 8th USENIX Conference on File and Storage Technologies, FAST'10, Berkeley, CA, USA, 14 pp. (2010).

Debnath B.K. et al., "SARD: A Statistical Approach for Ranking Database Tuning Parameters," Data Engineering Workshop, 2008, ICDEW 2008, IEEE 24th International Conference on, IEEE, Piscataway, NJ, USA, Apr. 7, 2008 (Apr. 7, 2008), pp. 11-18,XP031246594, ISBN: 978-1-4244-2161-9.

Elnaffar S., et al., "Characterizing Computer Systems' Workloads," Innovations in Information Technology, 2006, Dec. 31, 2002 (Dec. 31, 2002), XP055303996, Pi ISBN: 978-1-4244-0673-9, Retrieved from the Internet: URL: http://research.cs.queensu.ca/TechReports/Reports/2002-461.pdf [retrieved on Sep. 20, 2016].

International Search Report and Written Opinion for Application No. PCT/US2014/013034 dated May 29, 2014, 10 pages.

Narayanan D., et al., "Continuous Resource Monitoring for Self-Predicting DBMS," Modeling, Analysis, and Simulation of Computer and Telecommunication Systems, 2005, 13th IEEE International Symposium, Atlanta, GA, USA Sep. 27-29, 2005, Piscataway, NJ, USA, IEEE, Sep. 27, 2005 (Sep. 27, 2005), pp. 239-248, XP010843600, DOI: 10.1109/MASCOTS. 2005.21, ISBN: 978-0-7695-2458-0.

Supplementary European Search Report for Application No. EP14757585 dated Sep. 30, 2016, 13 pages.

Yoo R.M., et al., "Hierarchical Means: Single Number Benchmarking with Workload Cluster Analysis," IEEE 10th International Symposium on Workload Characterization, 2007, pp. 204-213.

Non-Final Office Action on co-pending U.S. Appl. No. 13/781,619 dated Nov. 28, 2014.

Final Office Action on co-pending U.S. Appl. No. 13/781,619 dated Sep. 11, 2015.

Non-Final Office Action on co-pending U.S. Appl. No. 13/781,619 dated Mar. 2, 2016.

Final Office Action on co-pending U.S. Appl. No. 13/781,619 dated Sep. 20, 2016.

Notice of Allowance on co-pending U.S. Appl. No. 13/781,619 dated Jul. 3, 2017.

Notice of Allowance on co-pending U.S. Appl. No. 13/781,619 dated Jul. 24, 2017.

\* cited by examiner

METHODS FOR PROVISIONING WORKLOADS IN A STORAGE SYSTEM USING MACHINE LEARNING AND DEVICES THEREOF

FIELD

This technology generally relates to provisioning workloads in a storage system using machine learning and, more particularly, to methods, non-transitory computer readable media, and devices for estimating latency resulting from a new workload or an increased workload intensity in order to inform workload provisioning decisions.

BACKGROUND

Administrators are often tasked with provisioning applications to be associated with storage devices, such as one or more storage servers, and specifically volumes on the storage devices. The applications can utilize a provisioned volume to service client requests, such as by storing data on, and/or retrieving data from, the provisioned volume. The interactions or load pattern of an application with a provisioned volume over a period of time can be referred to as a workload. Accordingly, workloads have associated characteristics, such as the percentage of operations during a period of time that are read or write operations or that are random or sequential operations, for example, although many other characteristics can be used as part of a workload analysis.

In storage networks, many storage devices with different characteristics (e.g., cache size, number of spindles, and/or layout) and associated volumes may be present and available to be provisioned for many applications. However, administrators are not able to effectively determine what performance impact provisioning a new workload, migrating an existing workload, or increasing the intensity (e.g., resulting from an increase in the number of users assigned to a specific application instance) may have, rendering provisioning decisions difficult. For example, administrators may be unable to know whether increasing the intensity of an existing workload will maintain compliance with an established service level objective (SLO). Additionally, administrators are unable to determine the headroom or maximum input/output operations per second (IOPS) that can be pushed until only latency is increased without any increase in operations.

SUMMARY

A provisioning advisor computing device includes a processor coupled to a memory and configured to execute programmed instructions stored in the memory to obtain an intensity and characteristics for each of a plurality of training workloads from storage device volumes. For each of the training workloads, at least first and second training workload parameters are generated, based on the training workload intensity, and an associated training workload signature is generated, based on the training workload characteristics. The first and second training workload parameters and associated training workload signatures are stored in a mapping table. A signature and an intensity for a query workload are obtained. First and second query workload parameters are determined based on a correlation of the query workload signature with the training workload signatures of the mapping table. An estimated latency for the query workload is determined, based on the first and second query workload parameters and the query workload intensity, and the estimated query workload latency is output.

A method for provisioning workloads in a storage system using machine learning includes obtaining, by a provisioning advisor computing device, an intensity and characteristics for each of a plurality of training workloads from storage device volumes. For each of the training workloads, at least first and second training workload parameters are generated, by the provisioning advisor computing device and based on the training workload intensity, and an associated training workload signature is generated, by the provisioning advisor computing device and based on the training workload characteristics. The first and second training workload parameters and associated training workload signatures are stored, by the provisioning advisor computing device, in a mapping table. A signature and an intensity for a query workload are obtained by the provisioning advisor computing device. First and second query workload parameters are determined, by the provisioning advisor computing device, based on a correlation of the query workload signature with the training workload signatures of the mapping table. An estimated latency for the query workload is determined, by the provisioning advisor computing device and based on the first and second query workload parameters and the query workload intensity, and the estimated query workload latency is output by the provisioning advisor computing device.

A non-transitory computer readable medium having stored thereon instructions for provisioning workloads in a storage system using machine learning includes machine executable code which when executed by a processor, causes the processor to perform steps including obtaining an intensity and characteristics for each of a plurality of training workloads from storage device volumes. For each of the training workloads, at least first and second training workload parameters are generated, based on the training workload intensity, and an associated training workload signature is generated, based on the training workload characteristics. The first and second training workload parameters and associated training workload signatures are stored in a mapping table. A signature and an intensity for a query workload are obtained. First and second query workload parameters are determined based on a correlation of the query workload signature with the training workload signatures of the mapping table. An estimated latency for the query workload is determined, based on the first and second query workload parameters and the query workload intensity, and the estimated query workload latency is output.

With this technology, administrators can more effectively determine the performance impact of provisioning a new workload, migrating an existing workload, or increasing the intensity of an existing workload, for example, as well as optionally the workload headroom. Using a machine learning process based on historical operation and training workloads, this technology can provide a relatively accurate estimate of the latency that would result from a potential provisioning decision. Accordingly, administrators can make more effective decisions regarding application and volume provisioning resulting in more balanced storage network operation and better service for the clients utilizing the associated applications.

DETAILED DESCRIPTION

Figure 1:
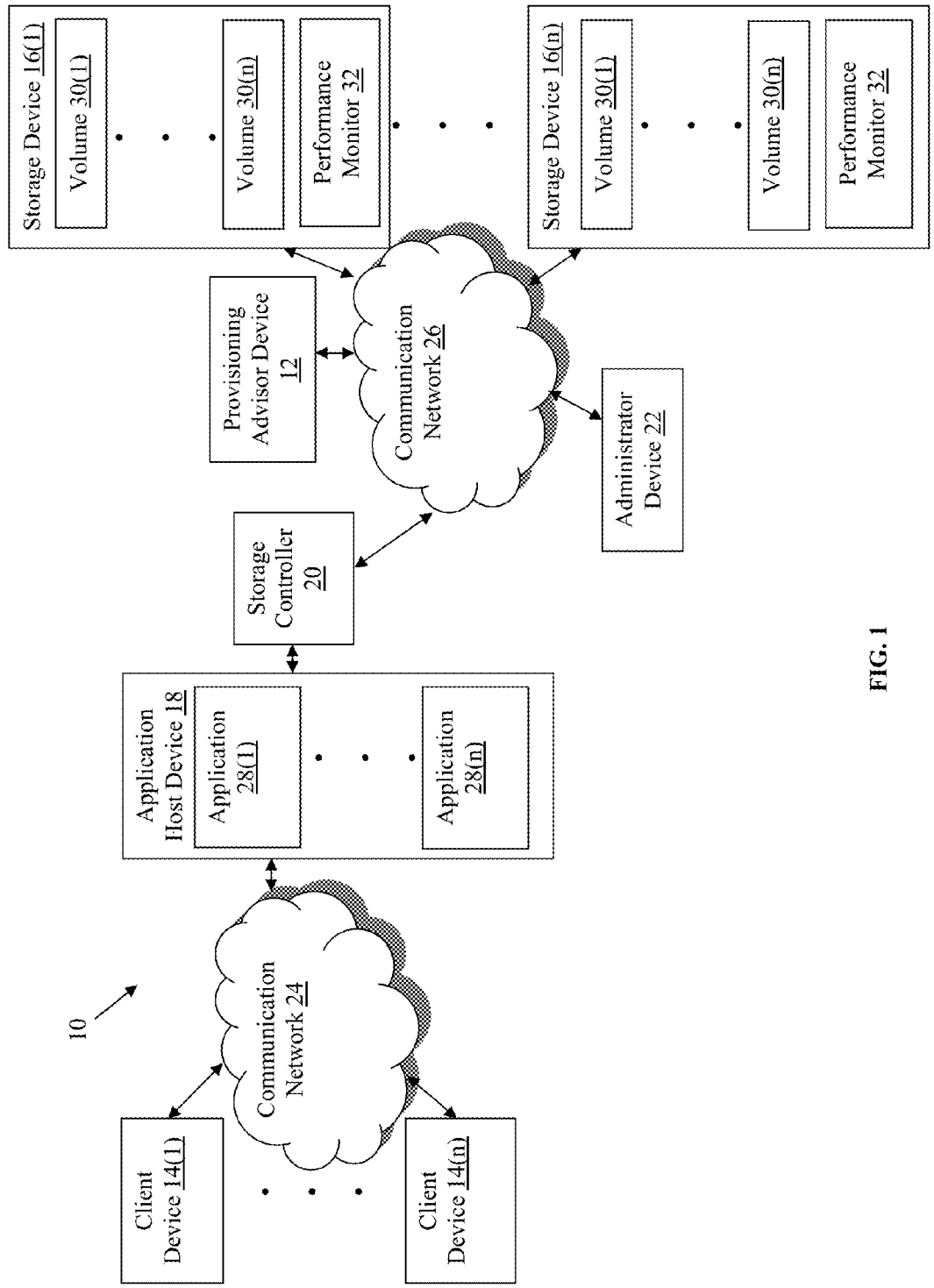
FIG. 1 is a block diagram of a network environment which incorporates an exemplary provisioning advisor device.

A network environment 10 with an exemplary provisioning advisor device 12 is illustrated in FIG. 1. The exemplary environment 10 further includes client devices 14(1)-14(n), storage devices 16(1)-16(n), an application host device 18, a storage controller 20, and an administrator device 22, although this environment 10 can include other numbers and types of systems, devices, components, and/or elements in other configurations, such as multiple numbers of each of these devices. The client devices 14(1)-14(n) are in communication with the application host device 18 through communication network 24 and the application host device 18 is in communication with the storage devices 16(1)-16(n) through the storage controller 20 and another communication network 26. The communication networks 24 and 26 can be local area networks (LANs), wide area networks (WANs), storage area networks (SANs), or combination thereof, for example. This technology provides a number of advantages including providing methods, non-transitory computer readable media, and devices that more efficiently estimate the latency resulting from provisioning a new workload or migrating or increasing the intensity of an existing workload.

Each of the client devices 14(1)-14(n) in this example can include a processor, a memory, a communication interface, an input device, and a display device, which are coupled together by a bus or other link, although each of the client devices 14(1)-14(n) can have other types and numbers of components. The client devices 14(1)-14(n) may run interface applications that provide an interface to exchange data with applications 28(1)-28(n) hosted by the application host device 18, for example. Each of the client devices 14(1)-14(n) may be, for example, a conventional personal computer (PC), a workstation, a smart phone, or other processing and/or computing system.

The storage server devices 16(1)-16(n) in this example receive and respond to various read and write requests from the application host device 18, such as requests to write or store data as a backup, as described and illustrated in more detail later. Each of the storage server devices 16(1)-16(n) can include a processor, a memory, and a communication interface, which are coupled together by a bus or other link, although each of the storage server devices 16(1)-16(n) can have other types and numbers of components. The memory can include conventional magnetic or optical disks, or any other type of non-volatile persistent storage suitable for storing large quantities of data.

In this example, at least a portion of the memory of each of the storage devices 16(1)-16(n) is organized into a plurality of volumes 30(1)-30(n) and includes a performance monitor 32. The performance monitor 32 is configured to monitor request traffic on a per volume basis and report intensity information and workload characteristics to the provisioning advisor device 12 either periodically or upon request, for example. The intensity information can include latency, outstanding input/output operations (OIO), and/or input/output operations per second (IOPS), for example, although other intensities can also be used. The workload characteristics can includes a percentage of write operations, a percentage of read operations, a percentage of operations that are neither read nor write operations, an average size of read data, an average size of written data, a percentage of random read operations, and/or a percentage of random write operations, for example, although other characteristics can also be used.

The application host device 18 can be an application server that hosts applications 28(1)-28(n) that can be utilized by the client devices 14(1)-14(n) and which can utilize the storage devices 16(1)-16(n) to manage associated data. The application host device 18 in this example can include a processor, a memory, and a communication interface, which are coupled together by a bus or other link, although the application host device 18 can have other types and numbers of components.

The storage controller 20 in this example can be provided between the application host device 18 and the storage devices 16(1)-16(n) and can manage traffic sent from the application host device 18 such that the traffic is routed to appropriate volume(s) 30(1)-30(n) of the storage devices 16(1)-16(n). Accordingly, the storage controller can manage the physical provisioning of the volumes 30(1)-30(n) of the storage devices 16(1)-16(n) associated with the applications 28(1)-28(n) hosted by the application host device 18. The storage controller 20 in this example can include a processor, a memory, and a communication interface, which are coupled together by a bus or other link, although the application host device 18 can have other types and numbers of components. Accordingly, the storage controller 20 can communicate with the storage device 16(1)-16(n) over the communication network 26 using a NFS or CIFS protocol for example, although other types and numbers of protocols can also be used.

The administrator device 22 in this example is used by a network administrator to communicate with the provisioning advisor device 12 to obtain information regarding the impact of provisioning workloads associated with the applications 28(1)-28(n) to be associated with the volumes 30(1)-30(n). Accordingly, the administrator device 22 can also communicate with the storage controller 20 to program the storage controller to implement the provisioning. The administrator device can include a processor, a memory, a communication interface, an input device, and a display device, which are coupled together by a bus or other link, although the administrator device 22 can have other types and numbers of components. The administrator device can be a conventional personal computer or any other type of network-connected computing device.

Figure 2:
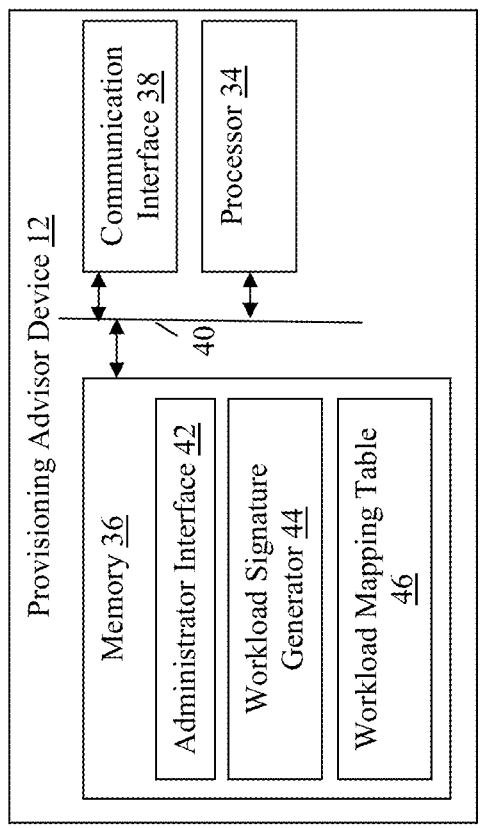
FIG. 2 a block diagram of the exemplary provisioning advisor device.

The provisioning advisor device 12 in this example obtained intensity and workload characteristics from the performance monitor 32 of the storage devices 16(1)-16(n) and uses the obtained information to respond to queries received from the administrator device 22, as described and illustrated in more detail later. Referring more specifically to FIG. 2, a block diagram of the exemplary provisioning advisor device 12 is illustrated. In this example, the provisioning advisor device 12 includes a processor 34, a memory 36, and a communication interface 38 coupled together by a bus 40 or other link, although other numbers and types of devices can also be used.

The processor 34 in the provisioning advisor device 12 executes a program of stored instructions one or more aspects of the present invention, as described and illustrated by way of the embodiments herein, although the processor 34 could execute other numbers and types of programmed instructions. The processor 34 in the provisioning advisor device 12 may include one or more central processing units or general purpose processors with one or more processing cores, for example.

The memory 36 in the provisioning advisor device 12 stores these programmed instructions for one or more aspects of the present invention, as described and illustrated herein, although some or all of the programmed instructions can be stored and/or executed elsewhere. A variety of different types of memory storage devices including random access memory (RAM), such as dynamic RAM (DRAM), or other computer readable medium which is read from and/or written to by a magnetic, optical, or other reading and/or writing system that is coupled to the processor 34 can be used.

In this example, the memory 24 includes an administrator interface 42, a workload signature generator 44, and a workload mapping table 46, although other types and numbers modules can also be included in the memory 36. The administrator interface 42 receives queries from an administrator and provides information in response, as described and illustrated in more detail later. The queries can be sent from the administrator device 22, for example, although the queries can also be submitted directly to the provisioning advisor device 12 through interaction with an input and/or display device of the provisioning advisor device 12 in other examples.

The workload signature generator 44 processes training workload characteristics obtained from the performance monitor 32 of the storage devices 16(1)-16(n) to generate a signature for various training workloads, as described and illustrated in more detail later. The workload mapping table 46 stores these generated signatures as associated with training workload parameter values generates for the training workloads, also as described and illustrated in more detail later.

The communication interface 38 in the provisioning advisor device 12 is used to communicate between the administrator device 22 and storage devices 16(1)-16(n), which are coupled together via the communication network 26, although other types and numbers of communication networks or systems with other types and numbers of connections and configurations to other devices and elements can also be used. By way of example only, one or more of the communication networks 24 and 26 can use TCP/IP over Ethernet and industry-standard protocols, including hypertext transfer protocol (HTTP), although other types and numbers of communication networks each having their own communications protocols can also be used.

Although examples of the provisioning advisor device 12, client devices 14(1)-14(n), storage devices 16(1)-16(n), application host device 18, storage controller 20, and administrator device 22 are described herein, the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by the processor 34 in the provisioning advisor device 12, cause the processor 34 to carry out the steps necessary to implement the methods of the examples, as described and illustrated herein.

Figure 3:
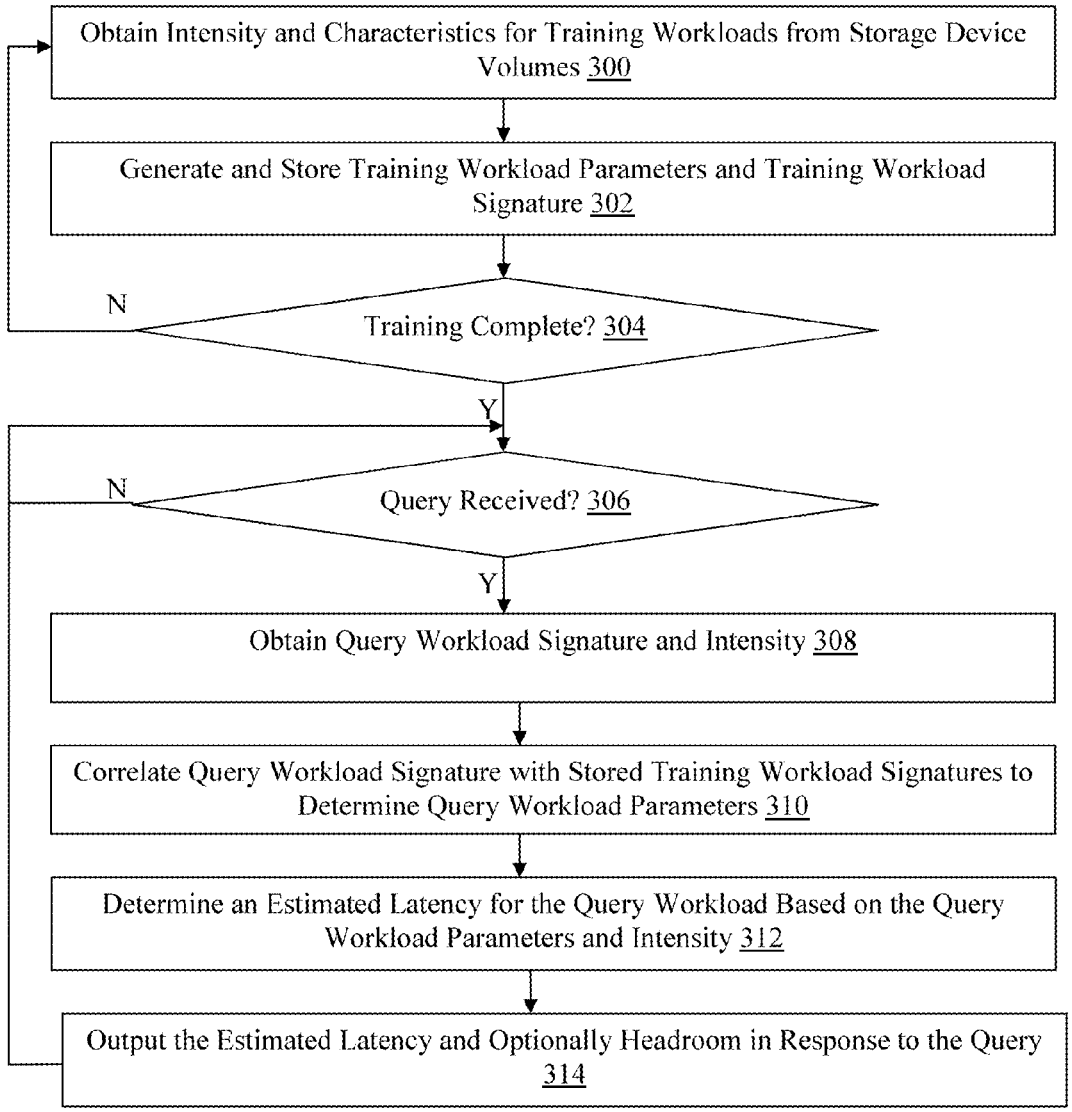
FIG. 3 is a flowchart of an exemplary method for provisioning workloads in a storage system using machine learning.

Referring to FIGS. 1-5, an exemplary method for provisioning workloads in a storage system using machine learning will now be described. Referring more specifically to FIG. 3, in step 300 in this example, the provisioning advisor device 12 obtains intensity and workload characteristics for training workloads from the storage devices 16(1)-16(n). The training workloads can be generated by a workload generator of the provisioning advisor device 12 or can be workloads selected during the normal operation of the storage devices 16(1)-16(n) over a specified period of time, for example. In this example, the workloads are obtained per volume 30(1)-30(n) and each of the applications 28(1)-28(n) is provisioned one of the volumes 30(1)-30(n), although other types of provisioning can also be used.

The intensity and workload characteristics for the training workloads can be obtained from the performance monitor 32 of each of the storage devices 16(1)-16(n) automatically and periodically or upon request from the provisioning advisor device 12, for example. In this example, the training workload intensity includes latency and at least one of outstanding input/output operations (OIO) or input/output operations per second (IOPS) for each volume 30(1)-30(n) at various points during a specified period of time, although other intensities including time delays and/or number of operations can be used and the intensity can be obtained by different methods. Additionally, the training workload characteristics includes at least one of a percentage of write operations, a percentage of read operations, a percentage of operations that are neither read nor write operations, an average size of read data, an average size of written data, a percentage of random read operations, or a percentage of random write operations, for example, although other workload characteristics can also be used.

In step 302, the provisioning advisor device 12 generates and stores training workload parameters and training workload signatures. In this example, first and second training workload parameters are generated based on the training workload intensity obtained in step 300. Optionally, the provisioning advisor device 12 can apply a robust envelope technique to the training workload intensity prior to generating the first and second training workload parameters. The applied robust envelope technique can include first removing outliers and next applying an upper envelope by taking a maximum of latency and IOPS or OIO data series points in a rolling window, for example. Other types of techniques and data cleaning methods can also be applied.

Figure 4:
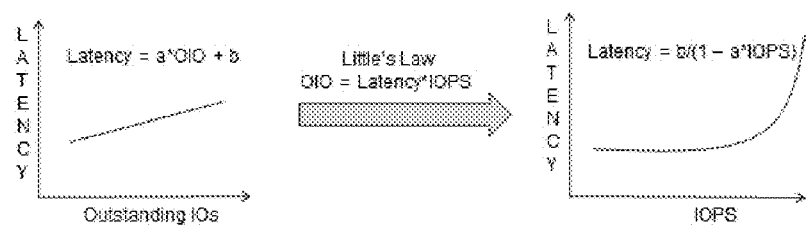
FIG. 4 is a graphical illustration of exemplary relationships between workload parameters, intensity, and latency.

Referring more specifically to FIG. 4, a graphical illustration of exemplary relationships between workload parameters, intensity, and latency is illustrated. The first and second training workload parameters are referred to in FIG. 4 as "a" and "b", respectively. In this example, subsequent to any optional data cleaning, latency and OIO can be plotted and a line can be fit, such as using a linear regression analysis for example, although other methods can also be used. Accordingly, the first training workload parameter is the slope of the line and the second training workload parameter is the intercept of the line. The first and second training workload parameters can also be determined using a plot of latency and IOPS, but the same intensity (OIO or IOPS) should be used for each of the training workloads for consistency. The linear relationship illustrated in the latency and OIO graph of FIG. 4 is described in more detail in A. Gulati, C. Kumar, I. Ahmad, and K. Kumar, "BASIL: Automated IO load balancing across storage devices," Proceedings of the 8th USENIX conference on File and Storage Technologies, FAST'10, Berkeley, Calif., USA, 2010, USENIX Association and A. Gulati, G. Shanmuganathan, I. Ahmad, C. A. Waldspurger, and M. Uysal, "Pesto: Online Storage Performance Management in Virtualized Datacenters," Proceedings of the Second ACM Symposium on Cloud Computing (SOCC '11), Cascais, Portugal, October 2011, each of which is incorporated herein in its entirety.

The training workload signatures are each generated based on the training workload characteristics. Exemplary methods for generating the training workload signatures are disclosed in U.S. patent application Ser. No. 13/781,619 entitled "Workload Identification" and U.S. patent application Ser. No. 13/945,797 entitled "Graphical Representation of Classification of Workloads," each of which is incorporated by reference herein in its entirety. Other methods of generating the training workload signatures can also be used. In this example, the provisioning advisor device 12 stores the first and second training workload parameters in the workload mapping table 46 as associated with the training workload signature for the corresponding training workload, although the training workload parameters and signatures can also be stored elsewhere.

Referring back to FIG. 3, in step 304, the provisioning advisor device 12 determines whether the training is complete. The provisioning advisor device 12 can determine whether the training is complete based on whether a time period established by an administrator has expired, a threshold amount of training data has been obtained, or at threshold number of workloads have been analyzed, for example, although other methods of determining whether the training has been complete can also be used. If the provisioning advisor device 12 determines that the training has not been completed, then the No branch is taken back to step 300 and the provisioning advisor device 12 continues obtaining intensity and workload characteristics for training workloads and generating and storing training workload parameters, as described and illustrated earlier. If the provisioning advisor device 12 determines that the training has been completed, then the Yes branch is taken to step 306.

In step 306, the provisioning advisor device 12 determines whether a query has been received. A query can be received from a user of the administrator device 22 using the administrator interface 42 that is provided to the administrator in response to a request, for example, although other methods of receiving a query can also be used. The query can be a request for an impact on performance of provisioning a new workload associated with an application and having the query workload signature or increasing an intensity of an existing workload associated with an application and having the query workload signature, for example, although other types of requests and queries can also be received. If the provisioning advisor device 12 determines a query is not received then the No branch is taken and the provisioning advisor device 12 effectively waits for a query to be received.

If the provisioning advisor device 12 determines in step 306 that a query has been received, then the Yes branch is taken to step 308. In step 308, the provisioning advisor device 12 obtains a query workload intensity and signature. The query workload intensity can be included in the query. For example, an administrator may submit a query requesting the impact on latency of pushing an additional 500 IOPS for a specified one of the applications 28(1)-28(n), such as a Microsoft Exchange™ application, for example. In this example, the Exchange™ application is already running since the administrator is requesting the impact of increasing the intensity, although it may not have been used to obtain the training workloads in step 300. Accordingly, the provisioning advisor device 12 can request the workload characteristics from the performance monitor 32 operating on the storage device 16(1)-16(n) for which the volume 30(1)-30(n) corresponding to the Exchange™ application is stored and can generate the query workload signature, as described and illustrated earlier with reference to step 302.

However, if the query relates to the provisioning of a new workload associated with a new one of the applications 28(1)-28(n), then the provisioning advisor device 12 can either request workload characteristics required to generate a query workload signature from the administrator in response to the query or mine the workload signature from the community. In order to mine the workload signature from the community, the provisioning advisor device 12 can search for a similar or corresponding application executing on a different system on behalf of a different customer, for example, for which the workload characteristics can be obtained which can be used to approximate the query workload signature. Other methods of obtaining the query workload signature can also be used.

Figure 5:
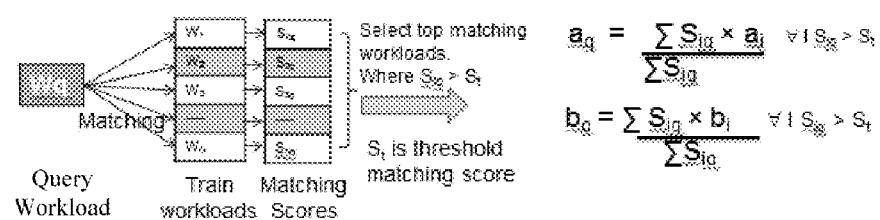
FIG. 5 is a graphical illustration of a flow of an exemplary method for determining query workload parameters.

In step 310, the provisioning advisor device 12 correlates the query workload signature with the training workload signatures stored in the workload mapping table 46 to determine first and second query workload parameters. The first and second query workload parameters are predicted or estimated parameters determined based on the training workload parameters associated with at least one training workload signatures that are closest matches with the query workload signature. Referring to FIG. 5, a graphical illustration of a flow of an exemplary method for determining the first and second query workload parameters is illustrated. In this example, the query workload signature is compared to the training workload signatures in the workload mapping table 46 and a score is generated based on how close the signatures match. For example, the workload signatures might each include a plurality of workload characteristics, a comparison of which can be used to generate the score. Optionally, the workload characteristics can be weighted based on relative importance in order to generate the scores.

Next in this example, the scores are compared to a threshold matching score and the top matching training workloads satisfying the matching score threshold are selected. Then, each of the first and second parameters associated in the workload mapping table 46 with a respective one of the top matching training workloads can be multiplied by the score determined for the respective top matching training workload to generate a sum which can be divided by the sum of all of the scores for all of the top matching workloads to generate the first and second query workload parameters. Other methods of generating the query workload parameters can also be used.

Referring back to FIG. 3, in step 312, the provisioning advisor device 12 determines an estimated latency for the query workload based on the query workload parameters generated in step 310 and the query workload intensity obtained in step 308. In one example in which the intensity obtained in step 308 is in terms of IOPS, the formula illustrated in FIG. 4 of latency=b/(1−a*IOPS) can be used to generate the estimated latency, where a and b are the first and second query workload parameters, respectively. Other intensities including OIO and other methods for determining the estimated latency can also be used.

Referring back to FIG. 3, in step 312, the provisioning advisor device 12 outputs the estimated latency and optionally a headroom in response to the query received in step 306. Although the first and second query workload parameters could be output in place of, or in addition to, the estimated latency, the estimated latency will generally be meaningful for an administrator and can directly correlate to an SLO to determine whether the impact of the provisioning decision will satisfy the SLO for a customer. Optionally, the estimated latency can be output through the administrator interface 42, although the estimated latency can also be output to the administrator device 22 in this example in other ways.

Also optionally, the headroom can be determined and output in step 312 along with the estimated latency. The headroom in this example is the maximum number of IOPS that can be pushed until only latency is increased and the system is saturated. Administrators generally are unaware of the actual headroom and tend to be overly conservative and push IOPS that actually result in conservative operation much lower than the headroom. However, if latency is considered to be approaching infinity in the formula illustrated in FIG. 4 of latency=b/(1−a*IOPS), then the headroom can be determined as 1/a, where a is the first query workload parameter determined in step 312. With the headroom, an administrator can determine how many IOPS can be pushed until saturation and can therefore make a relatively informed decision to operate the system at a relatively high percentage of headroom, resulting in more efficient operation of the network.

With this technology, administrators can make more informed decisions regarding provisioning of storage volumes for applications. Based on historical performance, administrators can determine the estimated latency resulting from migrating a workload associated with an application to a different storage volume, increasing the intensity of a workload associated with an application, or provisioning a new workload associated with an application on a storage volume. An administrator can then make an informed provisioning decision in view of the estimated latency and SLO for a customer. By improving the provisioning decision-making, storage systems can operate in a more balanced fashion resulting in improved performance from the perspective of clients utilized the associated applications.

Additionally, with this technology administrators can more effectively determine the performance impact of provisioning a new workload, migrating an existing workload, or increasing the intensity of an existing workload, for example, as well as optionally the workload headroom. Using a machine learning process based on historical operation and training workloads, this technology can provide a relatively accurate estimate of the latency that would result from a potential provisioning decision. Accordingly, administrators can make more effective decisions regarding application and volume provisioning resulting in more balanced storage network operation and better service for the clients utilizing the associated applications.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A machine implemented method, comprising:

selecting by a processor, a plurality of training workloads from a plurality of applications accessing a plurality of storage devices of a networked storage system using a plurality of storage volumes, wherein each training workload is defined by a training workload intensity and at least one workload characteristic, where the training workload intensity comprises of latency in processing input/output requests and at least one of outstanding input/output operations (OIO) or input/output operations per second (IOPS) processed by the plurality of storage device volumes and the at least one workload characteristic is based on a percentage of write operations, a percentage of read operations, and a percentage of operations that are neither read nor write operations;

generating by the processor, a training workload signature for each of the plurality of training workloads using a workload characteristic corresponding to each of the plurality of training workloads;

identifying by the processor, at least a first training workload parameter and a second training workload parameter corresponding to each of the plurality of training workloads based on the training workload intensity defined by a relationship between latency and one of OIO and IOPS for each training workload;

storing by the processor, the first training workload parameter and the second workload parameter at a mapping data structure for mapping the training workload signature of each training workload to the corresponding first training workload parameter and the second training workload parameter;

receiving by the processor, a first query for increasing intensity of an existing workload for an application currently using a storage device from among the plurality of storage devices;

obtaining by the processor, workload characteristic for the existing workload from the storage device storing data for the application for the existing workload;

generating by the processor, a first query workload signature for the existing workload using the obtained characteristic and with increased intensity;

selecting by the processor, training workloads from the mapping data structure by comparing the first query workload signature with stored training workload signatures using a score value that matches a threshold value indicating similarity between the first workload signature and stored training workload signatures;

using by the processor, the score value for the selected training workloads for determining a first query workload parameter and a second query workload parameter for the existing workload with increased intensity;

determining by the processor, an estimated latency for the first query, based on the first and second query workload parameters and additional intensity for the existing workload; outputting the estimated latency; and determining by the processor, a predicted headroom based on at least one of the first and second query workload parameters and using the predicted headroom for a provisioning decision for increasing intensity of the existing workload, wherein the predicted headroom indicates a maximum number of input/output operations that can be processed for the first query after which only latency increases indicating system saturation for using the storage device by the application.

2. The method of claim 1, wherein the first training workload parameter is a slope of a line and the second training workload parameter is an intercept of the line generated by plotting latency against a number of IOPS or OIO.

3. The method of claim 1, wherein before the first query is received, the processor determines if training using the training workloads is complete based on a threshold number of training workloads.

4. The method of claim 1, further comprising:
receiving by the processor, a second query for provisioning a new workload for the application;
generating by the processor, a second query workload signature by using workload characteristics of another application that is similar to the application;
selecting by the processor, training workloads from the mapping data structure by comparing the second query workload signature to stored training workload signatures;
determining by the processor, workload parameters for the second query;
determining by the processor, an estimated latency for the new workload based on the workload parameters determined for the new workload;
outputting by the processor, the estimated workload latency in response to the second query; and
determining by the processor, a predicted headroom for the second query and using the predicted headroom for provisioning the new workload.

5. The method of claim 1, wherein the estimated latency is used to determine an impact on a service level objective for a client using the plurality of storage device volumes.

6. The method of claim 1, wherein a robust envelope technique is applied to the training workload intensity prior to generating the first and second training workload parameters.

7. The method of claim 1, wherein the training workload intensity and the training workload characteristics are obtained from a performance monitor of the plurality of storage devices.

8. A non-transitory machine readable medium having stored thereon instructions comprising machine executable code, which when executed by a machine, causes the machine to:
select by a processor, a plurality of training workloads from a plurality of applications accessing a plurality of storage devices of a networked storage system using a plurality of storage volumes, wherein each training workload is defined by a training workload intensity and at least one workload characteristic, where the training workload intensity comprises of latency in processing input/output requests and at least one of outstanding input/output operations (OIO) or input/output operations per second (IOPS) processed by the plurality of storage device volumes and the at least one workload characteristic is based on a percentage of write operations, a percentage of read operations, and a percentage of operations that are neither read nor write operations;
generate by the processor, a training workload signature for each of the plurality of training workloads using a workload characteristic corresponding to each of the plurality of training workloads;
identify by the processor, at least a first training workload parameter and a second training workload parameter corresponding to each of the plurality of training workloads based on the training workload intensity defined by a relationship between latency and one of OIO and IOPS for each training workload;
store by the processor, the first training workload parameter and the second workload parameter at a mapping data structure for mapping the training workload signature of each training workload to the corresponding first training workload parameter and the second training workload parameter;
receive by the processor, a first query for increasing intensity of an existing workload for an application currently using a storage device from among the plurality of storage devices;
obtain by the processor, workload characteristic for the existing workload from the storage device storing data for the application for the existing workload;
generate by the processor, a first query workload signature for the existing workload using the obtained characteristic and with increased intensity;
select by the processor, training workloads from the mapping data structure by comparing the first query workload signature with stored training workload signatures using a score value that matches a threshold value indicating similarity between the first workload signature and stored training workload signatures;
use by the processor, the score value for the selected training workloads for determining a first query workload parameter and a second query workload parameter for the existing workload with increased intensity;
determine by the processor, an estimated latency for the first query, based on the first and second query workload parameters and additional intensity for the existing workload; outputting the estimated latency; and
determine by the processor, a predicted headroom based on at least one of the first and second query workload parameters and using the predicted headroom for a provisioning decision for increasing intensity of the existing workload, wherein the predicted headroom indicates a maximum number of input/output operations that can be processed for the first query after which only latency increases indicating system saturation for using the storage device by the application.

9. The non-transitory machine readable medium of claim 8, wherein the first training workload parameter is a slope of a line and the second training workload parameter is an intercept of the line generated by plotting latency against a number of IOPS or OIO.

10. The non-transitory machine readable medium of claim 8, wherein before the first query is received, the processor determines if training using the training workloads is complete based on a threshold number of training workloads.

11. The non-transitory machine readable medium of claim 8, wherein the machine executable code, which when executed by the machine, further causes the machine to:
receive by the processor, a second query for provisioning a new workload for the application;
generate by the processor, a second query workload signature by using workload characteristics of another application that is similar to the application;
select by the processor, training workloads from the mapping data structure by comparing the second query workload signature to stored training workload signatures;
determine by the processor, workload parameters for the second query;

determine by the processor, an estimated latency for the new workload based on the workload parameters determined for the new workload;

output by the processor, the estimated workload latency in response to the second query; and determine by the processor, a predicted headroom for the second query and using the predicted headroom for provisioning the new workload.

12. The non-transitory machine readable medium of claim 8, wherein the estimated latency is used to determine an impact on a service level objective for a client using the plurality of storage device volumes.

13. The non-transitory machine readable medium of claim 8, wherein a robust envelope technique is applied to the training workload intensity prior to generating the first and second training workload parameters.

14. The non-transitory machine readable medium of claim 8, wherein the training workload intensity and the training workload characteristics are obtained from a performance monitor of the plurality of storage devices.

15. A system, comprising:

a memory containing machine readable medium comprising machine executable code having stored thereon instructions; and a processor coupled to the memory, the processor configured to execute the machine executable code to:

select a plurality of training workloads from a plurality of applications accessing a plurality of storage devices of a networked storage system using a plurality of storage volumes, wherein each training workload is defined by a training workload intensity and at least one workload characteristic, where the training workload intensity comprises of latency in processing input/output requests and at least one of outstanding input/output operations (OIO) or input/output operations per second (IOPS) processed by the plurality of storage device volumes and the at least one workload characteristic is based on a percentage of write operations, a percentage of read operations, and a percentage of operations that are neither read nor write operations;

generate a training workload signature for each of the plurality of training workloads using a workload characteristic corresponding to each of the plurality of training workloads;

identify at least a first training workload parameter and a second training workload parameter corresponding to each of the plurality of training workloads based on the training workload intensity defined by a relationship between latency and one of OIO and IOPS for each training workload;

store the first training workload parameter and the second workload parameter at a mapping data structure for mapping the training workload signature of each training workload to the corresponding first training workload parameter and the second training workload parameter;

receive a first query for increasing intensity of an existing workload for an application currently using a storage device from among the plurality of storage devices;

obtain workload characteristic for the existing workload from the storage device storing data for the application for the existing workload;

generate a first query workload signature for the existing workload using the obtained characteristic and with increased intensity;

select training workloads from the mapping data structure by comparing the first query workload signature with stored training workload signatures using a score value that matches a threshold value indicating similarity between the first workload signature and stored training workload signatures;

use the score value for the selected training workloads for determining a first query workload parameter and a second query workload parameter for the existing workload with increased intensity;

determine an estimated latency for the first query, based on the first and second query workload parameters and additional intensity for the existing workload; outputting the estimated latency; and determine a predicted headroom based on at least one of the first and second query workload parameters and using the predicted headroom for a provisioning decision for increasing intensity of the existing workload, wherein the predicted headroom indicates a maximum number of input/output operations that can be processed for the first query after which only latency increases indicating system saturation for using the storage device by the application.

16. The system of claim 15, wherein the first training workload parameter is a slope of a line and the second training workload parameter is an intercept of the line generated by plotting latency against a number of IOPS or OIO.

17. The system of claim 15, wherein before the first query is received, the processor determines if training using the training workloads is complete based on a threshold number of training workloads.

18. The system of claim 15, wherein the machine executable code, further causes to:

receive a second query for provisioning a new workload for the application;

generate a second query workload signature by using workload characteristics of another application that is similar to the application;

select training workloads from the mapping data structure by comparing the second query workload signature to stored training workload signatures;

determine workload parameters for the second query;

determine an estimated latency for the new workload based on the workload parameters determined for the new workload;

output the estimated workload latency in response to the second query; and determine a predicted headroom for the second query and using the predicted headroom for provisioning the new workload.

19. The system of claim 15, wherein the estimated latency is used to determine an impact on a service level objective for a client using the plurality of storage device volumes.

20. The system of claim 15, wherein a robust envelope technique is applied to the training workload intensity prior to generating the first and second training workload parameters.

21. The system of claim 15, wherein the training workload intensity and the training workload characteristics are obtained from a performance monitor of the plurality of storage devices.

* * * * *